E. E. WINKLEY.
AUTOMATIC STEERING APPARATUS.
APPLICATION FILED APR. 1, 1918.

1,361,127.

Patented Dec. 7, 1920.
2 SHEETS—SHEET 1.

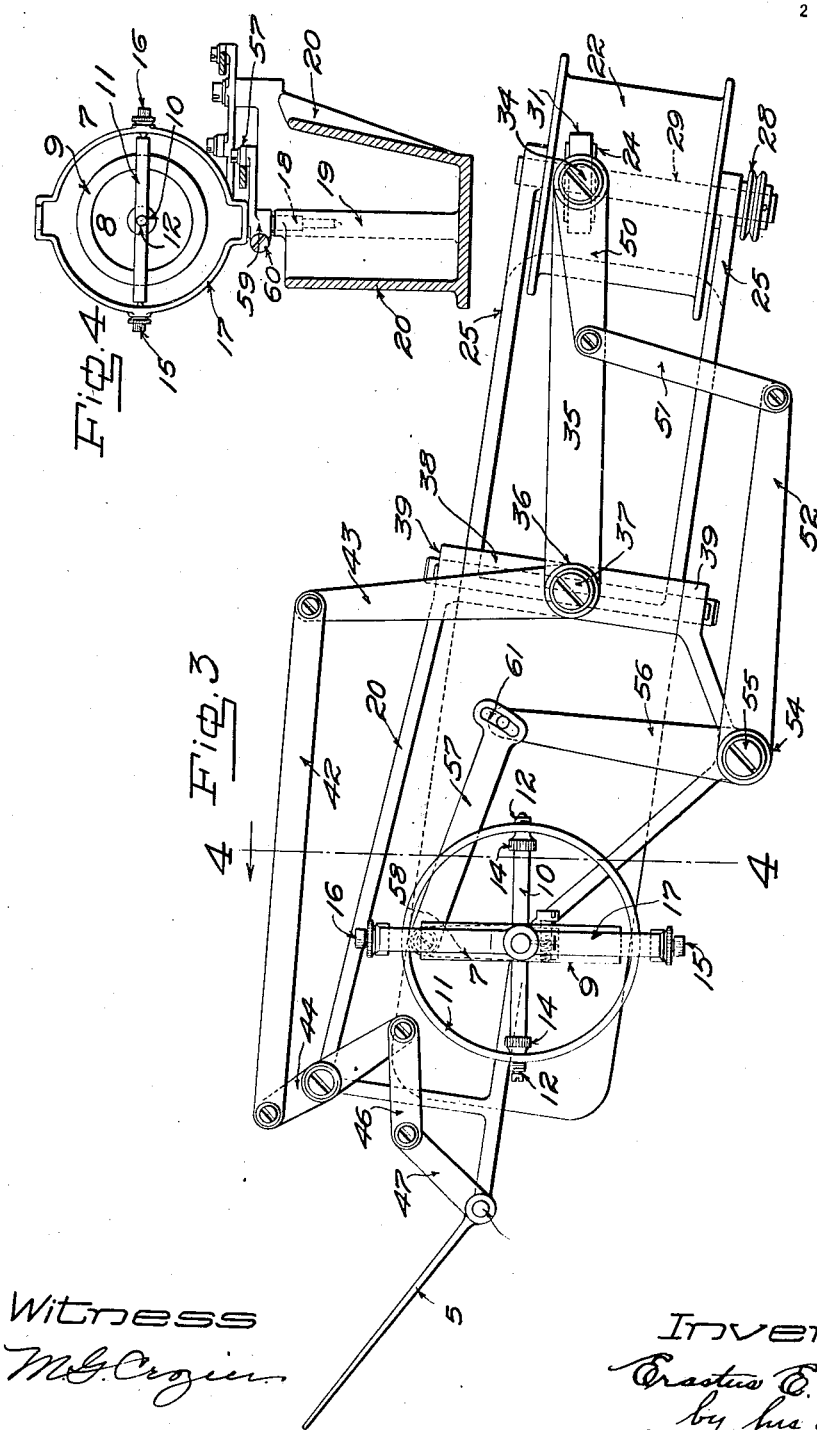

UNITED STATES PATENT OFFICE.

ERASTUS E. WINKLEY, OF LYNN, MASSACHUSETTS.

AUTOMATIC STEERING APPARATUS.

1,361,127.   Specification of Letters Patent.   Patented Dec. 7, 1920.

Application filed April 1, 1918. Serial No. 226,007.

*To all whom it may concern:*

Be it known that I, ERASTUS E. WINKLEY, a citizen of the United States, residing at Lynn, in the county of Essex and State of Massachusetts, have invented certain new and useful Improvements in Automatic Steering Apparatus; and I do hereby declare the following to be a full, clear, and exact description of the invention, such as will enable others skilled in the art to which it appertains to make and use the same.

The present invention relates to an improvement in automatic steering apparatus of the type employed to direct a vehicle or other moving object on a predetermined course and to restore the vehicle or moving object to the predetermined course in case it is caused to deviate therefrom.

Where vehicles or other moving objects are guided on a predetermined course, the means most commonly employed for determining the course is either a gyroscope or a compass-controlled device. In the present instance a gyroscope is employed to determine the course, and the main object of the invention is to produce improved and simplified power mechanism for operatively connecting the guiding device of the vehicle with the gyroscope so that the guiding device will effectively hold the vehicle on the course as determined by the gyroscope, and so that in case the vehicle deviates from its course the guiding device will be turned in a direction to restore it to the course. With this object in view and such other objects as are incidental to the accomplishment thereof, the invention consists in the structure particularly pointed out in the appended claims, a specific embodiment of this structure being described in the following specification.

Figure 1:
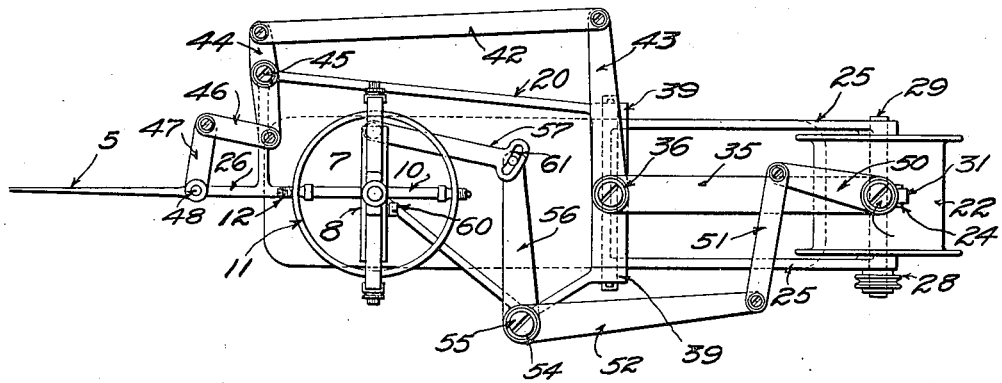
Figure 2:
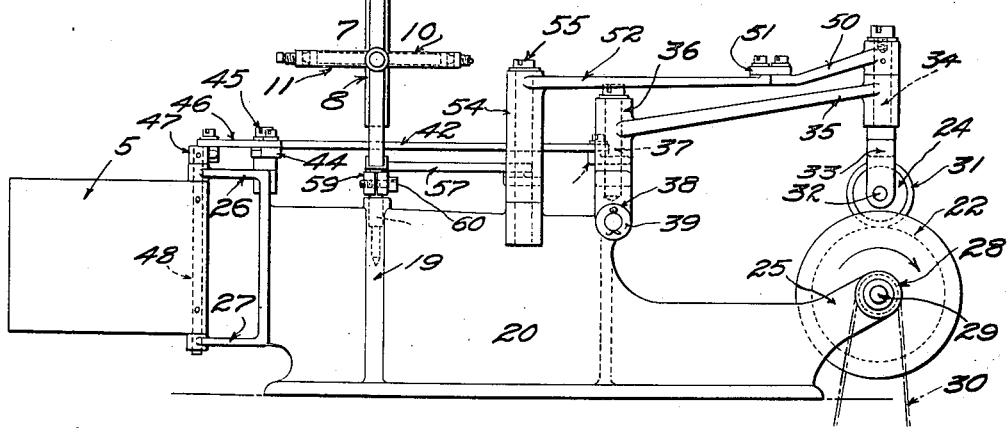

In the accompanying drawings illustrating the preferred form in which it is contemplated embodying the invention, Figure 1 is a plan of the improved automatic steering apparatus; Fig. 2 is a side elevation of the parts shown in Fig. 1; Fig. 3 is a plan similar to Fig 1, but on an enlarged scale, showing the positions of the parts of the apparatus when the head or bow of the vehicle has swerved to the right of its course and the apparatus has acted to restore the vehicle to its course; and Fig. 4 is a section taken along the line 4—4 of Fig. 3.

The vehicle or moving object to which the mechanism of the present invention is applied for controlling its progression on a predetermined course, will necessarily be provided with a guiding device, which may be the ailerons of an aeroplane, or the rudder of a torpedo vessel, flying machine or other moving object. For the sake of convenience of description, the guiding device is shown as the usual vertically disposed rudder, which is indicated by the reference numeral 5, for controlling the horizontal progression of the vehicle, whether the latter is terrestrial, marine or aerial. The means for setting the vehicle on its predetermined course is shown as a gyroscope of usual construction, indicated generally at 7. The disk 8 of the gyroscope with its weight concentrated in the rim 9, is fixed on a shaft 10 which is normally horizontally disposed, pivoted at both ends in a gimbal ring 11. Adjustment screws 12 are provided for taking up lost motion, and checknuts 14 hold the adjustment screws in adjusted position. The ring 11 is supported on the center points 15 and 16 in an outer ring 17 secured to a pin 18 which is fulcrumed in the upper end of a post 19 rising from the base of the frame 20, on which the various parts of the automatic steering apparatus are supported. This frame 20 is formed as a raised wall, the construction and arrangement of which is clearly shown in the drawings and needs no particular description. The gyroscope is loosely mounted in the post 19 for the purpose of permitting the vehicle to move relatively to the gyroscope without affecting it in case the vehicle should swerve from its course. The rotation of the disk may be imparted in any usual way. So long as this rotation continues, the longitudinal axis of the disk, that is, the axis running through the shaft 10, will have a strong tendency to point in the direction in which it was pointed when the rotation was imparted to the disk. This is in accordance with the well-known principle of gyroscopic action. The axis of the gyroscope, which will hereinafter be referred to as the shaft 10, will of course, when the rotation is imparted to the disk 8, be made to point in the direction in which the vehicle is to proceed.

It is the province of the improved mechanism of the present invention to operatively connect the gyroscope with the rudder so that the latter will be acted upon to hold the vehicle in the course determined by the direction in which the shaft 10 is pointed, and will be acted upon to restore the vehicle to its course, that is, in alinement or parallelism with the shaft 10 upon a deviation therefrom. The connections between the gyroscope and the rudder are so constructed and arranged that the strain to which the gyroscope is subjected in controlling the rudder is negligible, whereas the strain exerted upon the rudder shall be sufficient to turn it to restore the vehicle to its course, however much it may have swerved therefrom. These connections comprise a constantly traveling, driving member or rotating drum 22, a roll 24, a set of levers connecting the gyroscope with the roll 24, and a second set of levers which connect the roll with the rudder. The constantly rotating drum 22 is journaled in arms 25 extending forwardly and outwardly from the frame 20. The drum is mounted as shown in Fig. 2, at one end of the frame 20, and the rudder 5 is mounted in upper and lower arms 26 and 27 respectively projecting outwardly from the other end of the frame 20. The gyroscope is located relatively near the rudder. The drum 22 is driven in the direction indicated by the arrow in Fig. 2 by a pulley 28 fixed on an extension of the shaft 29 on which the drum is mounted. The pulley 28 is connected by a belt 30 with the vehicle propelling means, or with an independent source of power, which will continue in operation so long as the vehicle is to continue its journey. The drum may be constructed of wood, and its periphery coated with some friction material so as to insure a good gripping action between it and the roll 24. The roll 24, of which the rim 31 is composed of rubber or other material permitting a good gripping action, is mounted on a stud 32 passed through the bifurcated end 33 of a vertically disposed rod 34 journaled in the outer end of an arm 35 of a bellcrank lever 36 pivoted on a pin 37 rising from a hub 38 journaled in ears 39 on the upper edge of the frame 20. This pivoting of the bellcrank lever 36 on a horizontal axis is for the purpose of permitting a slight vertical movement to the roll 24 so that its pressure, and consequently its gripping action on the periphery of the drum, may be regulated as desired by the addition of weights.

The bellcrank lever 36 constitutes a part of the connections between the roll 24 and the rudder 5. The remainder of these connections comprise a link 42 pivoted at one end to the outer end of the arm 43 of the bellcrank 36, and at the other end to a lever 44 fulcrumed at 45 on the frame 20. A second link 46 connects the lever 44 with an arm 47, fixed on the vertically-disposed rod 48 which supports the rudder in the arms 26 and 27.

The connections between the roll 24 and the gyroscope comprise an arm 50 fixed at its forward end to the rod 34 which supports the roll. The rear end of the arm 50 is connected by a link 51 to the forward end of the arm 52 of a bellcrank lever 54 pivoted at 55 on the frame. The other arm 56 of the bellcrank 54 is connected by a link 57 with the outer end of an arm 58 (Fig. 4), the hub 59 of which embraces the pin 18 which supports the gyroscope. The hub 59 of the arm 58 is split so that the gyroscope may be adjusted relatively to its associated parts, and a screw 60 secures the arm 58 to the pin 18 when the gyroscope has been set in position to determine the course of the vehicle. The forward end of the link 57 is provided with a slot 61 to permit a slight slip between it and the arm 56.

When the vehicle is proceeding on its predetermined course, in which case the longitudinal axis of the vehicle is in alinement or parallelism with the longitudinal axis of the gyroscope, and the rudder 5 is in alinement with the course of the vessel, the axis of the roll 24 is in alinement with the axis of the drum 22 and the roll is in engagement with the middle of the drum. This is the neutral position of the roll, as shown in Fig. 1, which illustrates the positions of the parts of the steering apparatus when the vehicle is proceeding undisturbed on its predetermined course.

If now the vehicle is deflected from its course, for example, to the right thereof, the longitudinal axis of the gyroscope will remain constant and the longitudinal axis of the vehicle will be at an angle threreto, and so, consequently, the frame 20 and the parts in fixed relation thereto will be in angular relation with the gyroscope; this is shown in Fig. 3. The fixed position of the gyroscope causes it to exert a pull on the bellcrank 54 and swing it contra-clockwise, thereby turning the roll 24 at an angle to the axis of the drum. The degree of the angular relation between the axes of the roll and the drum is proportionate to the degree the vehicle is swerved from its course. This angular position of the roll on the drum causes it to travel longitudinally of the drum until its axis is again in alinement with the axis of the drum. The movement of the roll is toward the axis of the gyroscope, that is, away from the new direction of the vehicle. By this movement, the roll acts through the lever connections between it and the rudder to turn the rudder in a direction to restore the vehicle to its course. This action is illustrated in Fig. 3. As the vehicle is restored to its predetermined course, in response to the turning of the rudder, the continued constant position of the longitudinal axis of the gyroscope causes the bellcrank 54 to swing in a clockwise direction, thereby turning the roll so that it will travel toward the middle of the drum. When finally the vehicle has been restored to its predetermined course, in alinement with the axis of the gyroscope, the roll will be in neutral position and the rudder will be in alinement with the course of the vehicle. If the vehicle is deflected to the left of its course, the parts of the steering apparatus in turning the rudder to restore the vehicle to its course will move in the reverse direction to that in which they moved when the vehicle was restored to its course on a deviation to the right therefrom.

It will be apparent from the foregoing that the movement imparted to the rudder is proportional to the movement of the vessel in relation to a given course, both during a deflecting movement of the vessel from its course and during a restoring movement of the vessel toward the course.

Having thus described the invention, what is claimed is:

1. An automatic steering apparatus for vehicles having, in combination, a guiding device, power mechanism for turning the guiding device, and a gyroscope for controlling the action of the power mechanism on the guiding device in such manner that the amount of movement imparted to the guiding device is proportional to the amount which the vehicle deviates from a predetermined course.

2. An automatic steering apparatus for vehicles having, in combination, a traveling driving member, a roll to engage the surface of the driving member, a gyroscope for varying the angle of the roll, and a guiding device the turning movements of which are controlled by the transverse travel of the roll.

3. An automatic steering apparatus for vehicles having, in combination, means for setting the vehicle on a predetermined course, a guiding device, a rotating drum, a roll coöperating therewith, connections between the course-setting means and the roll, and connections between the roll and the guiding device.

4. An automatic steering apparatus for vehicles having, in combination, a guiding device, mechanism for varying the angular position of the guiding device relatively to the vehicle and a gyroscope for controlling said mechanism to cause the angular position of the guiding device to vary proportionally as the angular position of the vehicle varies with relation to a predetermined course.

5. An automatic steering apparatus for vehicles having, in combination, a guiding device, mechanism for varying the angular position of the guiding device with relation to the vehicle, and means for controlling said mechanism to cause the angular position of the guiding device to vary as the angular position of the vehicle varies with relation to a predetermined course, both during a deflecting movement of the vehicle from the predetermined course and during a restoring movement of the vehicle toward the predetermined course.

6. An apparatus for maintaining a vehicle on a given course having, in combination, a guiding device movable relatively to the vehicle to change the direction of travel of the vehicle, and automatically controlled means for continuously moving the guiding device relatively to the vehicle during substantially the extent of a continuous deflecting movement of the vehicle from the course irrespective of the extent of the deflecting movement of the vehicle, said movement of the guiding device being proportional to the deflecting movement of the vehicle.

7. An apparatus for maintaining a vehicle on a given course having, in combination, a guiding device movable relatively to the vehicle to change the direction of travel of the vehicle, and automatically controlled means for continuously moving the guiding device relatively to the vehicle during substantially the entire extent of a continuous restoring movement of the vehicle to its course irrespective of the extent of the restoring movement of the vehicle, said movement of the guiding device being proportional to the restoring movement of the vehicle.

8. An apparatus for maintaining a vehicle on a given course having, in combination, a guiding device movable relatively to the vehicle to change the direction of travel of the vehicle, and automatically controlled means for continuously moving the guiding device relatively to the vehicle toward neutral position during substantially the entire extent of a continuous restoring movement of the vehicle to its course irrespective of the extent of the restoring movement of the vehicle.

ERASTUS E. WINKLEY.